Sept. 27, 1932.  C. R. NALLE  1,879,421
ADJUSTABLE CASTER
Filed April 15, 1931
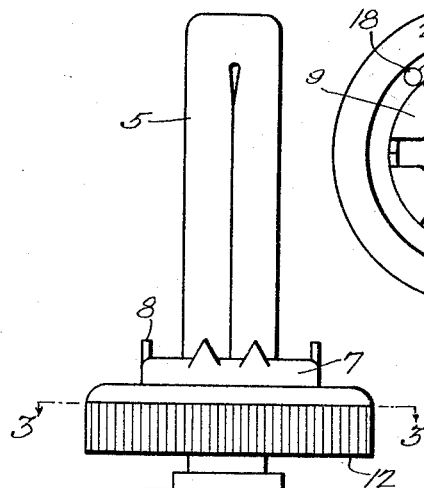
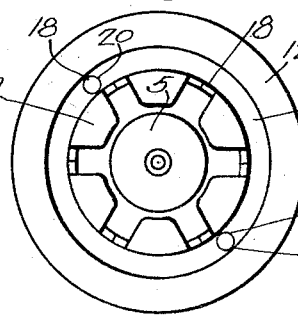
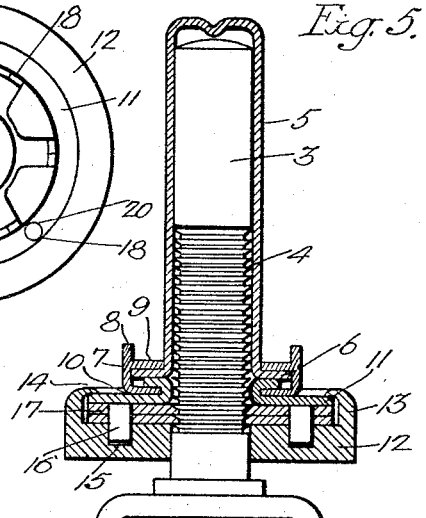
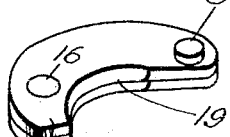
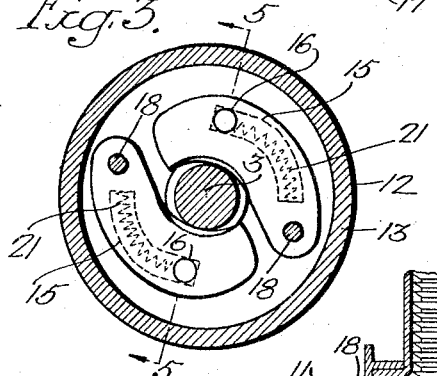
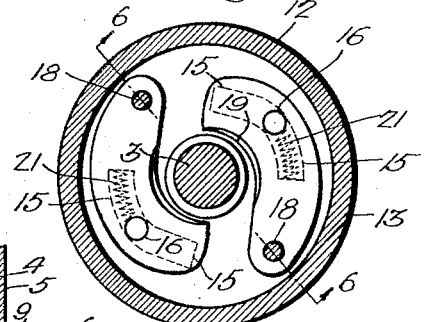
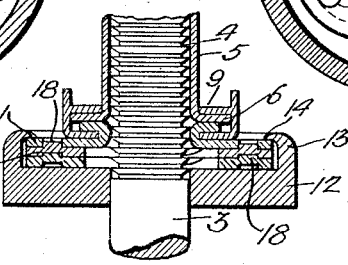
Inventor:
Charles R. Nalle
by his Attorneys
Howson & Howson Patented Sept. 27, 1932

1,879,421

UNITED STATES PATENT OFFICE

CHARLES R. NALLE, OF PHILADELPHIA, PENNSYLVANIA

ADJUSTABLE CASTER

Application filed April 15, 1931. Serial No. 530,381.

This invention relates to improvements in casters and particularly casters of the adjustable type.

The general object of the invention is to provide a caster which may be easily and quickly adjusted vertically without tilting or otherwise disturbing the piece of furniture supported by the caster.

As is well known, considerable annoyance is caused by the wobbling and tilting of pieces of furniture, such as tables, desks and the like, which are supported on casters due to the fact that all of the casters do not rest upon the floor. This condition is caused either by the unevenness of the floor or the warping of the furniture. In my prior Patent No. 1,500,465, granted July 8, 1924, I have disclosed a caster which is designed specifically to enable adjustment of the caster to overcome the objectionable condition pointed out. The device of the present invention is in the nature of an improvement over the device disclosed in the said patent.

A further object of the invention is to provide a simple and compact device which may form part of the caster and present a neat appearance, all of the parts except the operating member being concealed.

Other objects and features of the invention will become apparent hereinafter. The invention may be readily understood from the following detailed description and the accompanying drawing, in which:

Fig. 1 is an elevational view of my improved caster;

Fig. 2 is a plan view of the device;

Fig. 3 is a sectional view taken along line 3—3 of Fig. 1 and showing clearly the locking dogs of the device in locking position;

Fig. 4 is a sectional view similar to Fig. 3 with the locking dogs in unlocking position;

Fig. 5 is a sectional view of the caster taken along line 5—5 of Fig. 3;

Fig. 6 is a partial sectional view taken along line 6—6 of Fig. 4; and

Fig. 7 is a perspective view of one of the locking dogs of the device.

Referring to the several views of the drawing and particularly to Figs. 1 and 5, numeral 1 designates the yoke of a caster in which the usual wheel or roller 2 is journaled. The yoke carries an upright shank or stem 3 which, in the present instance, is provided with annular grooves 4. As shown clearly in Figs. 5 and 6, these grooves are formed so that their upper surfaces are horizontal, while their lower surfaces are beveled. The purpose of this construction is to enable positive meshing with the locking dogs, as will appear more clearly hereinafter.

The usual guide member 5, which is adapted to slidably and rotatably receive stem 3, is provided. The lower end of the guide is bent outwardly to provide a peripheral flange 6 which is adapted for retention by a weight-supporting member 7.

The weight-supporting member is formed to provide alternate upwardly extending teeth 8 and retaining tabs 9. As will be evident from Figs. 5 and 6, the tabs are bent inwardly to engage flange 6 of the guide to retain the same. The base 10 of the weight-supporting member 7 is provided with a central aperture through which stem 3 extends. A circular disk 11 having a centrally located aperture for the reception of stem 3 has its inner edge bent to provide a U-shaped retaining portion which engages the edge of base 10.

From the description thus far, it will be apparent that the weight-supporting member 7 is adapted to engage the lower end of the leg of a piece of furniture, and that its teeth 8 are adapted to bite into such leg. The weight-supporting member retains the guide 5 and also disk 11. While the centrally located apertures in member 7 and disk 11 are disclosed herein as circular, these apertures may be non-circular, such as hexagonal, to positively prevent relative movement of the member and disk. It is essential that disk 11 be held stationary, as will appear hereinafter. In further accordance with the present invention, a second and thicker disk 12, also having a centrally located aperture for the reception of stem 3, is provided. This disk has an upwardly extending peripheral flange 13 which tapers at its upper edge to provide a relatively thin portion 14 which may be readily bent inwardly to engage the upper surface of disk 11, as shown clearly in Figs.

5 and 6. It will be apparent that disk 12 constitutes a shallow cup-shaped member.

The upper surface of disk 12 is cut to provide eccentric grooves 15 (see Figs. 3 and 4). These grooves function to guide depending pins 16 of the locking dogs 17. As illustrated clearly in Fig. 7, the locking dogs may be built up of a number of arcuate members, in the present instance, two such members being shown. These dogs are provided at one end with an upwardly extending projection 18, the depending pin or stud 16 being located near the other end of the dog. The purpose of these dogs is to engage in the grooves 4 of stem 3, and to that end they are provided with beveled edges 19 which conform in shape with the grooves of the stem. As is shown in Fig. 5, groove-engaging edges 19 of the dogs have their upper surface beveled to co-act with the grooves 4 of the stem. In the present instance, the two dog elements engage adjacent grooves. It is clearly apparent that a single dog element or more than two such elements may be used. Obviously the number will depend largely on the load to be imposed upon the particular caster and the desired strength thereof. While it is obvious that the locking dogs may take various forms. I prefer to form the extension 18 on the dogs by pressing out a circular portion of each of the component elements, the pressed-out projection on one element fitting into the recess of the one above (see Fig. 6). Thus, the individual elements of the dogs may be locked together at one end. I also prefer to punch a hole in each of the elements and force a pin through such holes to provide the necessary depending pin or stud 16 and to lock the elements at the other end.

The upwardly extending projection 18 of each locking dog is inserted in an aperture 20 provided in disk 11. As shown in Figs. 3 and 4, two dogs are used and diametrically opposite holes may be provided in disk 11 to accommodate the pins thereof. Thus, the dogs are pivotally attached at one end to disk 11, and are horizontally disposed within the cup-shaped member formed by disk 12 with their pins 16 projecting downward into grooves 15 of the disk. A coil spring 21 is disposed in each eccentric groove 15 between an end wall of the groove and the projecting pin of the locking dog. It will be apparent that these springs function to exert pressure between disk 12 and the pin of the dogs.

Referring again to Fig. 5, it will be apparent that when the caster is suitably attached to the leg of a piece of furniture, the weight-supporting member 7 will be immovable as will also be the members retained thereby, including disk 11. The upper edge 14 of the side walls of disk 12 are so bent over the peripheral edge of disk 11 as to allow rotary movement of disk 12 with respect to disk 11. It will be apparent from a consideration of Figs. 3 and 4 that since one end of each dog is permanently retained by disk 11 and the dogs are only capable of a rocking movement about their pivots, rotation of disk 12 in a counter-clockwise direction will cause the locking dogs to move outward to the position illustrated in Fig. 4. Such counter-clockwise movement of the adjusting disk is opposed to the action of springs 15 which normally urge the disk in a clockwise direction with respect to the locking dogs. It will thus be apparent that the device will normally set itself in the position illustrated in Fig. 3, wherein the dogs engage the grooves of stem 3 to lock the weight-supporting assembly at a certain position along the stem. In order to adjust the caster, it is only necessary to rotate the adjusting disk to unlock the dogs in the manner previously indicated. The caster may now be moved to the desired position and the adjusting disk released. In normal operation, the caster may be allowed to drop under the influence of gravity or the furniture leg may be raised or lowered, as will be clearly apparent.

It is unnecessary to rotate the adjusting disk in a clockwise direction to return the dogs to locking position, since the springs function to return the disk. Obviously the disk may be suitably knurled, as indicated in Fig. 1, to facilitate turning thereof.

In assembling the device, the upturned inner edge of disk 11 is first inserted within the aperture of member 7 and then bent as shown to engage such member. The guide may then be positioned within member 7 and tabs 9 may be bent inwardly to retain the guide. The dogs, having been previously formed, are now disposed within the cup-shaped member along with the springs which are properly inserted in the grooves of such member. This assembly may then be attached to the previously formed assembly by inserting the edge of disk 11 within the cup-shaped member and bending the upper edge 14 of such member over the edge of the disk. The novel assembly is now completed and may be used with the stem of any caster having its stem provided with the annular grooves as illustrated.

It will be apparent from the foregoing description and the accompanying disclosure that the device is so constructed as to enable its ready manufacture and assembly in a quick and economic manner. Most of the parts merely necessitate stamping and forming the same with suitable dies. Obviously various changes in the details of construction of the device may be made and the invention is to be limited only as becomes necessary in view of the prior art. Only such limitations, therefore, as are imposed by the appended claims are to be placed upon the invention.

I claim:

1. In an adjustable caster, an upstanding shank having grooves therein, a weight-supporting member slidable along said shank, a disk carried by said member, a rotatable disk carried by said first disk, one of said disks having eccentric slots therein, and locking dogs pivotally attached to the other of said disks and having projections engaging in said slots, said dogs having arcuate edges engaging in the grooves of said shank.

2. In an adjustable caster, an upstanding shank having grooves therein, a weight-supporting member slidable along said shank, a disk carried by said member, a rotatable disk carried by said first disk, one of said disks having eccentric slots therein, locking dogs pivotally attached to the other of said disks and having projections engaging in said slots, said dogs having arcuate edges engaging in the grooves of said shank, and means normally urging said rotatable disk in a direction to normally maintain said dogs in their groove-engaging position.

3. In an adjustable caster, an upstanding shank having grooves therein, a weight-supporting member slidable along said shank, a disk carried by said member, a rotatable disk carried by said first disk and having eccentric slots therein, and locking dogs pivotally attached to said first disk and having projections engaging in said slots, said dogs having arcuate edges engaging in the grooves of said shank.

4. In an adjusting caster, an upstanding shank having grooves therein, a weight-supporting member slidable along said shank, a disk carried by said member, a rotatable disk carried by said first disk and having eccentric slots therein, locking dogs pivotally attached to said first disk and having projections engaging in said slots, said dogs having arcuate edges engaging in the grooves of said shank, and means normally urging said rotatable disk in a direction to normally maintain said dogs in their groove-engaging position.

5. In an adjusting caster, an upstanding shank having grooves therein, a weight-supporting member slidable along said shank, a disk carried by said member, a rotatable disk carried by said first disk and having eccentric slots therein, locking dogs pivotally attached to said first disk and having projections engaging in said slots, said dogs having arcuate edges engaging in the grooves of said shank, and springs disposed in said slots normally urging said rotatable disk in a direction to normally maintain said dogs in their groove-engaging position.

CHARLES R. NALLE.